Nov. 15, 1949     E. I. FORSMAN     2,488,282
ADJUSTABLE TOOL-HOLDING DEVICE
Filed Sept. 17, 1947     2 Sheets—Sheet 1
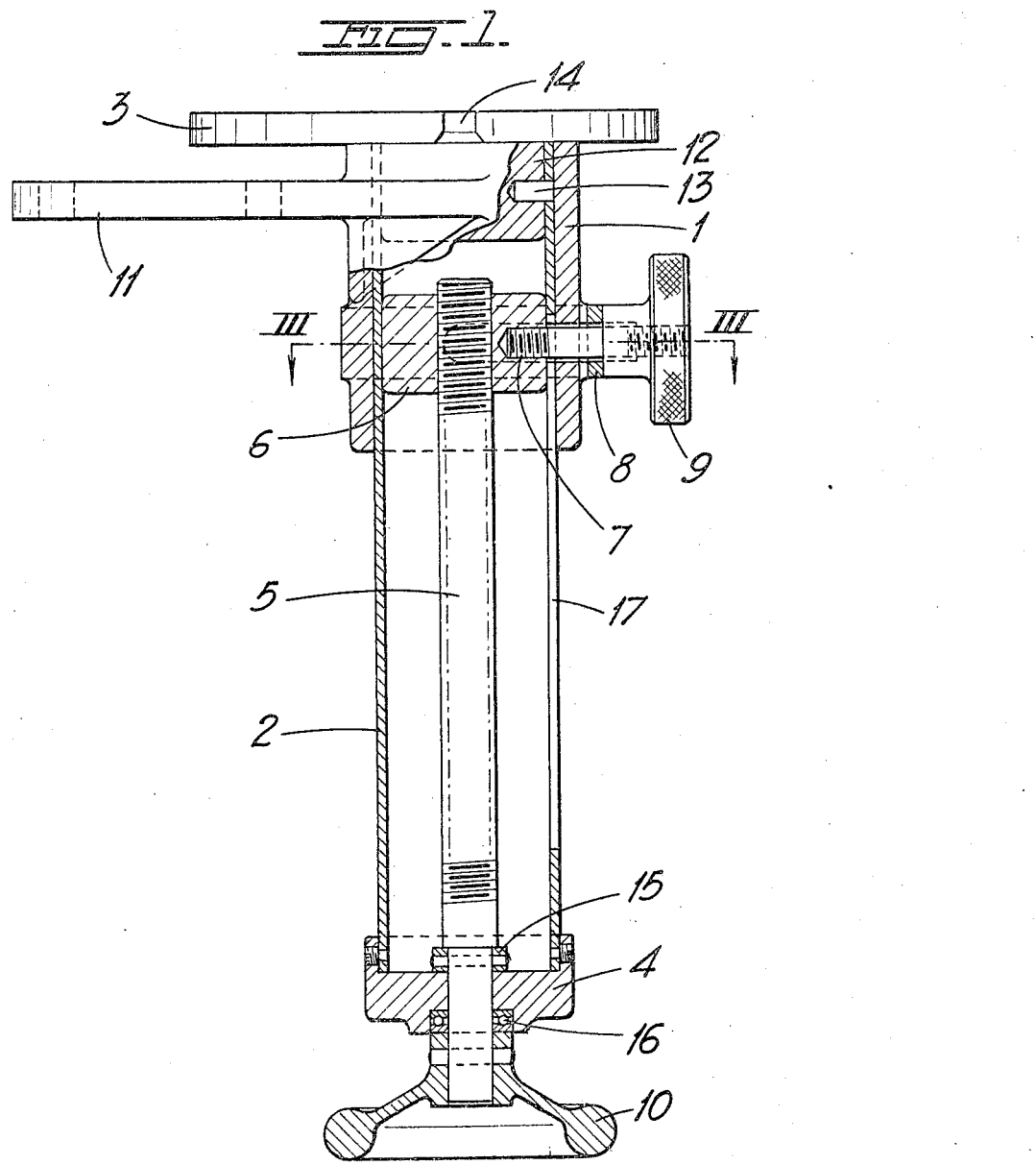
Inventor
Einar Italias Forsman Nov. 15, 1949 E. I. FORSMAN 2,488,282
ADJUSTABLE TOOL-HOLDING DEVICE
Filed Sept. 17, 1947 2 Sheets-Sheet 2
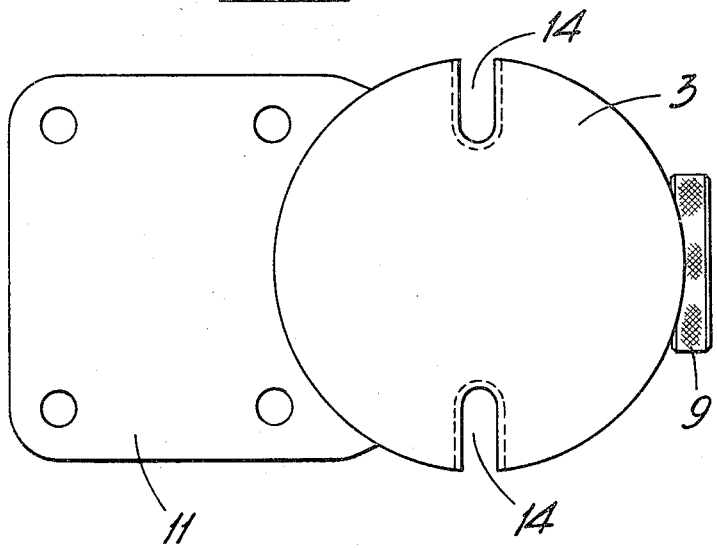
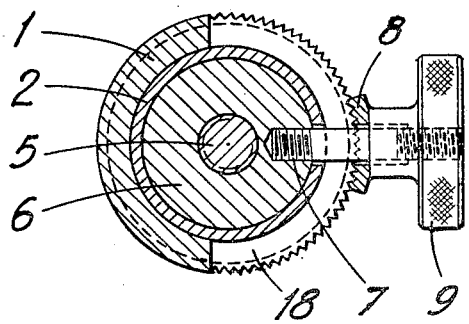
Inventor
Einar Italias Forsman Patented Nov. 15, 1949

2,488,282

UNITED STATES PATENT OFFICE 2,488,282

ADJUSTABLE TOOL-HOLDING DEVICE

Einar Italias Forsman, Stockholm, Sweden

Application September 17, 1947, Serial No. 774,515
In Sweden November 4, 1946

3 Claims. (Cl. 81—41)

The present invention relates to an adjustable tool-holding device more particularly intended for use with tools such as screw vises, and preferably intended for fixing to a stationary support as a work bench for instance, the principle object being to enable the tool to be adjusted in a stable manner to different positions for the purpose of facilitating the work. In a preferred form of construction adjustment for change of height may be effected by displacement of the holder in a vertical direction, for example, while adjustment for change of horizontal position may be effected by rotation of the holder in a horizontal plane whereby in the case of a vise a desired orientation may be given to the jaws thereof.

To the foregoing end or ends, the holding device according to the invention comprises a guiding sleeve attachable to a support, a work bench, for example, a tube slidably mounted in said sleeve and adapted to carry a tool at one of its ends, a screw within the tube being rotatably supported at the other end of the tube and threaded through a fixed nut over which the tube is free to slide to and fro, said nut being held in position relatively to the guiding sleeve by means of a bolt engaging the nut after passing through the sleeve and through a longitudinal slot in the tube, whereby the tube can be displaced in the sleeve by rotating the adjusting screw.

According to a preferred embodiment of the invention the guiding sleeve is also provided over a part of its periphery with a circumferential slot through which the aforesaid bolt passes for the purpose of permitting rotational displacement of the tube in the guiding sleeve.

In order that the present invention may be more readily understood reference is hereinafter made to the constructional form illustrated by way of example in the accompanying drawings, in which:

Fig. 1 shows a front elevation, partly in section, of the holding device.

Fig. 2 is a plan view of the device, and

Fig. 3 shows a horizontal section on the line III—III in Fig. 1.

As shown, the holding device which for extended choice of position can be not only raised and lowered but also rotated about a vertical axis has a support consisting of a guiding sleeve I and an attached plate II, the latter intended to be fixed to a support, work bench for instance. Inside the guiding sleeve a tube 2 is slidably mounted to the upper end of which a tool carrying plate 3 is fixed, preferably by radially pinning the stem 12 of the plate 3 to the tube 2 by a pin or screw 13. The stem 12 may make a force fit in the tube 2. The plate 3 is provided with notches 14 for screwing the tool, for example a vise, tightly thereto.

At the lower end of the tube 2 a bottom portion or cover 4 is attached, e. g., by small radial screws, and this cover rotatably supports a shouldered down non-threaded lower end of a screw rod 5, axially introduced into the tube. Inside the cover the shoulder of the screw-rod 5 abuts a ring 15 fixed to the rod. The ring in its turn is supported by the cover. At the outer end of the screw rod a wheel 10 is fixed, the inner face of the hub of which rests against an axial bearing 16 mounted in a recess in the outside of the cover 4 and surrounding the rod 5.

The inner threaded portion of the rod 5 is screwed into a cylindrical nut 6 over which the tube 2 is free to slide up and down. The nut 6 is retained in position inside the guiding sleeve I by means of a radial screw-in bolt 7 which passes through a longitudinal slot 17 in the tube 2 and through a circumferential slot 18 in the guiding sleeve I. The longitudinal slot 17 extends over a considerable part of the length of the tube 2 and permits the upward and downward displacement of the tube in the guiding sleeve on the rotation of the screw 5 by means of the wheel 10, so that said slot slides along the bolt 7 which is secured against vertical displacement and retains the block 6 against movement in any direction. The circumferential slot 18 in the guiding sleeve I permits angular displacement of the tube in a horizontal plane through an angle conveniently of 180°, the bolt 7 moving with the tube 2. At the outside of the guiding sleeve the bolt 7 is provided with a washer 8 and a nut 9. The latter serves to lock the holding device in a desired adjusted position, inasmuch as the tube 2 is clamped between the block 6 and the inside of the guiding sleeve I when the nut is drawn tight. Said nut may also suitably serve as a handle when rotating the tube 2 in the guiding sleeve.

Serrations formed along the circumferential slot 18 in the guiding sleeve I, as shown in Fig. 3, are engaged by corresponding serrations on the washer 8 upon tightening the nut 9. In this manner the holding device may be reliably secured in adjusted position.

The form of construction described may of course be varied in many of its details without departing from the scope of the invention. Thus for example, the circumferential slot in the guiding sleeve may be replaced by a circular hole for the bolt 7, whereby while the device can be raised and lowered it can not be angularly displaced.

I claim:

1. An adjustable tool-holding device comprising a guiding sleeve attachable to a support, a tube slidably mounted in said sleeve and having means on one end to mount a tool, a screw within the tube being rotatably supported at the other end of the tube and threaded through a fixed nut over which the tube is free to slide to and fro, said nut being held in position relatively to the guiding sleeve by means of a bolt engaging the nut after passing through a circumferential slot provided along a part of the periphery of the sleeve and through a longitudinal slot in the tube, thereby permitting rotational and longitudinal displacement of the tube in the sleeve.

2. An adjustable tool-holding device comprising a guiding sleeve attachable to a support, a tube slidably mounted in said sleeve and having means on one end to mount a tool, a screw within the tube being rotatably supported at the other end of the tube and threaded through a fixed nut over which the tube is free to slide to and fro, said nut being held in position relatively to the guiding sleeve by means of a bolt engaging the nut after passing through a circumferential slot provided along a part of the periphery of the sleeve and through a longitudinal slot in the tube, the latter being arranged to be locked in adjusted position by means of a nut on the outer end of the bolt.

3. An adjustable tool-holding device according to claim 2 characterized in that a serrated washer on the bolt engages a corresponding serration along the circumferential slot in the guiding sleeve by tightening the nut on the outer end of the bolt.

EINAR ITALIAS FORSMAN.

REFERENCES CITED

The following references are of record in the file of this patent:

UNITED STATES PATENTS

| Number | Name | Date |
|---|---|---|
| 513,261 | Eisele | Jan. 23, 1894 |
| 579,618 | Wanless | Mar. 30, 1897 |
| 955,259 | Gefvert | Apr. 19, 1910 |
| 1,667,504 | Zelberglet | Apr. 24, 1928 |